A. G. EWING.
SIGNAL FOR INDICATING SUBNORMAL PRESSURE IN PNEUMATIC TIRES.
APPLICATION FILED JUNE 24, 1920.
1,351,237.
Patented Aug. 31, 1920.
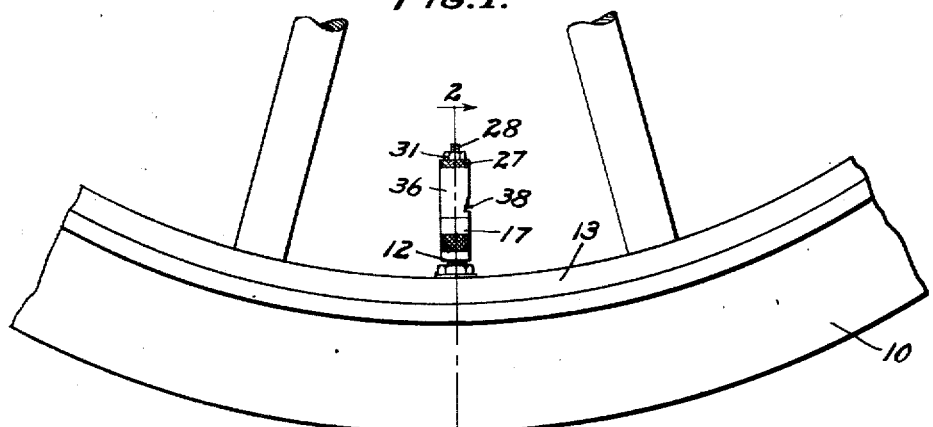
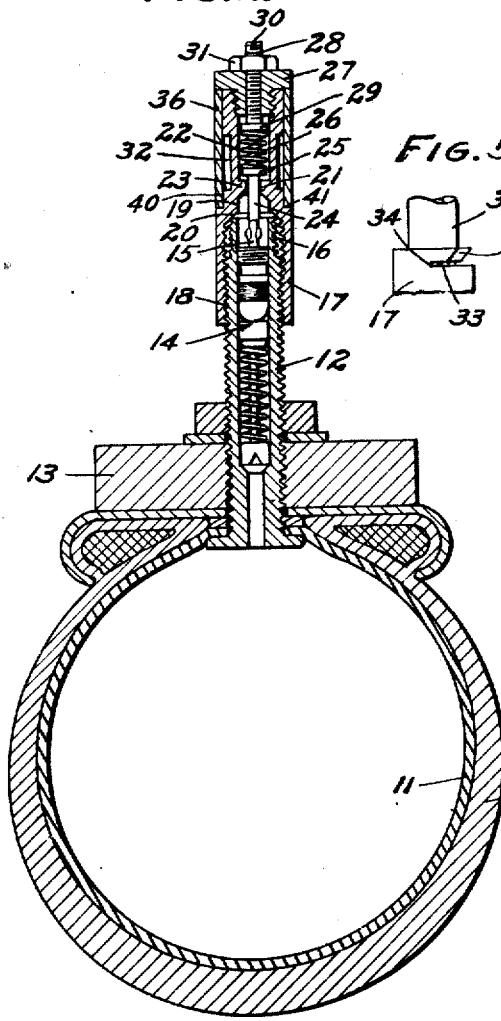
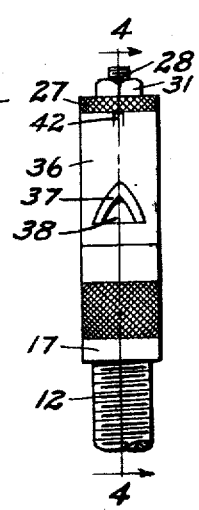
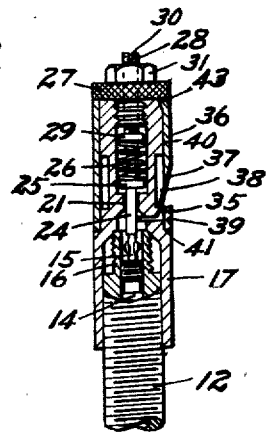
INVENTOR
ARTHUR G. EWING
BY
Hazard & Miller
ATTORNEYS.

UNITED STATES PATENT OFFICE.

ARTHUR GARFIELD EWING, OF LOS ANGELES, CALIFORNIA.

SIGNAL FOR INDICATING SUBNORMAL PRESSURE IN PNEUMATIC TIRES.

1,351,237.  Specification of Letters Patent.  Patented Aug. 31, 1920.

Application filed June 24, 1920. Serial No. 391,366.

*To all whom it may concern:*

Be it known that I, ARTHUR GARFIELD EWING, a citizen of the United States, residing at Los Angeles, in the county of Los Angeles and State of California, have invented new and useful Improvements in Signals for Indicating Subnormal Pressure in Pneumatic Tires, of which the following is a specification.

This invention relates to signals for indicating subnormal pressure in pneumatic tires for automobiles and the like, and more particularly to that class of pressure indicators adapted to give an audible signal when the pressure in the tire has fallen below a certain predetermined point; and the prime object of my invention is to provide a signal of this type which is simple and durable in construction, inexpensive to manufacture, and efficient in operation, which may be attached to any standard make of automobile tire.

The novel features of my improved signal device will be more fully set forth in the following specification taken in connection with accompanying drawings, in which:

Figure 1 is a fragmentary side elevation of an automobile wheel and tire showing my device attached to the tire valve casing.

Fig. 2 is an enlarged cross-sectional detail taken on line 2—2 of Fig. 1.

Fig. 3 is an enlarged elevation of my improved signal showing the whistle aperture.

Fig. 4 is a sectional view taken on line 4—4 of Fig. 3.

Fig. 5 is a fragmentary detail showing the air outlet in the body portion.

Referring now to the drawings, the numeral 10 designates any typical automobile tire having an inner tube 11 to which is secured the usual type of tire valve casing 12, extending upwardly through the felly 13, and in which is mounted a typical tire valve 14, having an upwardly extending tire valve stem 15, normally held in approximately the position shown by the internal pressure of the tire. The tire valve casing 12 is externally threaded and has an upper reduced portion 16 to receive the usual cap, not shown.

My improved device consists of a body portion 17, having a lower internally screw-threaded bore 18, adapted to screw on to the externally threaded tire valve casing 12, and may be of any suitable depth sufficient to hold the body portion 17 in rigid relation thereto. The bore 18 extends upwardly and is restricted as at 19, to form an annular shoulder 20, which shoulder rests upon the top of the reduced portion 16 of the tire valve casing 12, when the body portion 17 is screwed down to its proper position. A further restricted bore 21 extends from the bore 19 to an upper bore 22 through an intermediate transverse wall 23 between these two openings. The bores 18, 19, 21 and 22 are all preferably concentric with the common axis of the body member 17.

A plunger 24 is slidably mounted in the bore 21 and adapted to engage the upper end of the tire valve stem 15, being provided at its upper end with a spring seat 25 for supporting the lower end of an expansive coil spring 26. The plunger 24 is preferably of such a length that, when in normal contact with the upper end of valve stem 15, there will be adequate space intermediate the spring seat 25 and the upper side of the wall 23 to permit a downward movement sufficient to open the tire valve 14.

The upper end of the bore 22 is internally screw-threaded to receive a bushing 27; which in turn, has an internally screw-threaded bore to receive an adjusting screw 28 on the lower end of which is formed a spring seat 29. Screw 28, which has a kerf 30, and a lock nut 31 for securing it in any desired position, is adapted to adjust the tension of spring 26 to actuate the tire valve 15, through the medium of plunger 24, when the pressure within the tire falls below a certain predetermined point.

In the body portion 17, an annular channel 32 is cut, extending entirely around this portion, for the purpose of providing an adequate space for the escapement of air during the whistling operation of the signal, as will be hereinafter set forth. An air outlet aperture 33 is formed in the wall of body portion 17, immediately below the channel 32, by cutting a horizontal slot 34 through the wall thereof and into the bore 19. The upper wall above this slot is then beveled as at 35 to form an outlet, as clearly shown in Fig. 4, for directing the air upwardly as it escapes against the sleeve 36, and to be split by the beveled face 37 of whistle aperture 38.

In order to greatly simplify the construction of my device it is necessary to have the sleeve 36 form one wall of the upwardly extending portion 39 of the air outlet 33, and for this purpose there is an annular recess 40 cut in the body portion 17, extending from a point immediately below the slot 33 to the top of said body portion, of a depth equal to the thickness of the wall of sleeve 36, forming a shoulder 41 against which the lower end of the sleeve 36 abuts. The bushing 27 has a diameter sufficient when screwed down, to abut the upper end of the sleeve 36 to secure it in place. In order that the sleeve 36 may be quickly placed in position to bring the whistle aperture 38 in proper alinement with the air outlet 39, an indent 4? is made to coincide with a notch 43 in the body portion 17.

In the operation of my device the assembled parts, as hereinbefore set forth, are secured to the tire valve casing 12 as described. The proper tension is then applied to the spring 26 through the medium of the adjusting screw 28 to actuate the tire valve stem 15 when the pressure within the tire has fallen below a certain point. Say for instance, it is desired to maintain a pressure in the tire at all times of 70 pounds; then it is only necessary to inflate the tire to this pressure, turn the adjusting screw until the spring 26 has been sufficiently compressed to actuate the valve 14 and permit a small amount of air to escape. Thereafter, when the pressure within the tire falls below 70 pounds, the action of the spring 26 will overcome the pressure against the tire valve 14, depressing the valve through the medium of its stem 15, permitting the air within the tire to escape, and which, in turn, will give an audible signal to the driver through the medium of the whistle 38.

Having described my invention, I claim:

1. In a pressure signal for pneumatic tires, the combination of a body portion adapted to be secured to the tire valve casing having a central bore and spring actuated plunger therein and an intermediate transverse wall, a horizontal slot below said transverse wall connecting the internal bore to atmosphere, an annular channel above said slot, a bevel face on the wall intermediate said slot and said channel and a sleeve member containing a whistle aperture covering said slot and said channel.

2. In a pressure signal for pneumatic tires, the combination with a body member having upper and lower bores separated by a transverse wall and a spring actuated plunger therein, of an aperture below said transverse wall connecting the lower bore to atmosphere, an annular channel in the periphery of said body member, a recess cut in the face of the wall intermediate said aperture and said channel, and a sleeve containing a whistle aperture covering said aperture and said channel.

3. A pressure signal for pneumatic tires comprising a casing adapted to be screwed upon the tire valve stem and having a whistling aperture formed in its wall, a wall extending transversely of said casing above said aperture, a rod slidably mounted in said transverse wall and adapted to extend to and engage the valve in the valve stem, a spring mounted to press against the upper end of said rod above said transverse wall, and means for adjusting the pressure exerted by the spring whereby a decrease of a predetermined pressure in the tire will cause the tire valve to be opened and the whistle to be blown.

4. A pressure signal for pneumatic tires including a casing provided with an internal thread in one end adapted to screw on the end of a tire valve, a thick wall extending transversely of the casing and formed with a seat at one side to engage the end of said tire valve, said transverse wall being provided with a bore leading from said seat and communicating with the end of said tire valve, and with a smaller bore leading from said larger bore through the other side of said transverse wall, a rod extending through said bores and slidably mounted in said smaller bore, one end of said rod engaging the tire valve stem, a spring seat on the other end of said rod, a bushing screwed into the other end of said casing, a screw extending through said bushing, a spring seat on the inner end of said screw, a spring interposed between said spring seats, said casing being provided with a whistle opening, and said transverse wall being provided with a port leading from said larger bore through the other side of the wall and communicating with said whistle opening.

5. A pressure signal for pneumatic tires including a casing provided with an internal thread in one end adapted to screw on the end of a tire valve, a thick wall extending transversely of the casing, and formed with a seat at one side to engage the end of said tire valve, said transverse wall being provided with a bore leading from said seat and communicating with the end of said tire valve, and with a smaller bore leading from said larger bore through the other side of said transverse wall, a rod extending through said bores and slidably mounted in said smaller bore, one end of said rod engaging the tire valve stem, a spring seat on the other end of said rod, a bushing screwed into the other end of said casing, a screw extending through said bushing, a spring seat on the inner end of said screw, a spring interposed between said spring seats, and a whistle, said transverse wall being provided with a port leading from said larger bore to said whistle.

In testimony whereof I have signed my name to this specification.

ARTHUR GARFIELD EWING.